United States Patent [19]
Schexnayder

[11] 3,906,839
[45] Sept. 23, 1975

[54] RELIEF VALVE DAMPENING DEVICE

[75] Inventor: Lawrence F. Schexnayder, Joliet, Ill.

[73] Assignee: Caterpillar Tractor Company, Peoria, Ill.

[22] Filed: Mar. 7, 1974

[21] Appl. No.: 448,841

[52] U.S. Cl. ................. 91/418; 60/413; 137/491; 138/31
[51] Int. Cl.² ................ F15B 11/08; F15B 13/04
[58] Field of Search ........ 138/31, 26, 30; 417/300; 137/491; 60/413, 414–418; 92/30, 164; 91/443, 463, 418

[56] References Cited
UNITED STATES PATENTS

| | | | |
|---|---|---|---|
| 929,852 | 8/1909 | Hosford | 138/30 X |
| 1,035,386 | 8/1912 | Prescott et al. | 138/31 |
| 2,064,969 | 12/1936 | Carr et al. | 138/31 UX |
| 2,328,979 | 9/1943 | Herman et al. | 91/463 X |
| 2,707,002 | 4/1955 | Harris | 138/31 |
| 2,807,274 | 9/1957 | Evans | 137/491 UX |
| 3,126,795 | 3/1964 | Kesselring | 91/443 |
| 3,180,355 | 4/1965 | Long | 137/491 |
| 3,393,509 | 7/1968 | Kempson | 60/413 X |
| 3,416,561 | 12/1968 | Kokaly | 137/491 |
| 3,436,914 | 4/1969 | Rosfelder | 60/413 X |
| 3,593,741 | 7/1971 | Odenthal et al. | 137/491 X |

Primary Examiner—Irwin C. Cohen
Assistant Examiner—Edward Look
Attorney, Agent, or Firm—Phillips, Moore, Weissenberger Lempio & Strabala

[57] ABSTRACT

A dump valve of the type having a spool disposed to normally block communication between a high pressure port and a low pressure port and a balance chamber to control the opening and closing of the spool is provided with accumulator means communicating with the balance chamber.

8 Claims, 1 Drawing Figure

US Patent Sept. 23, 1975  3,906,839
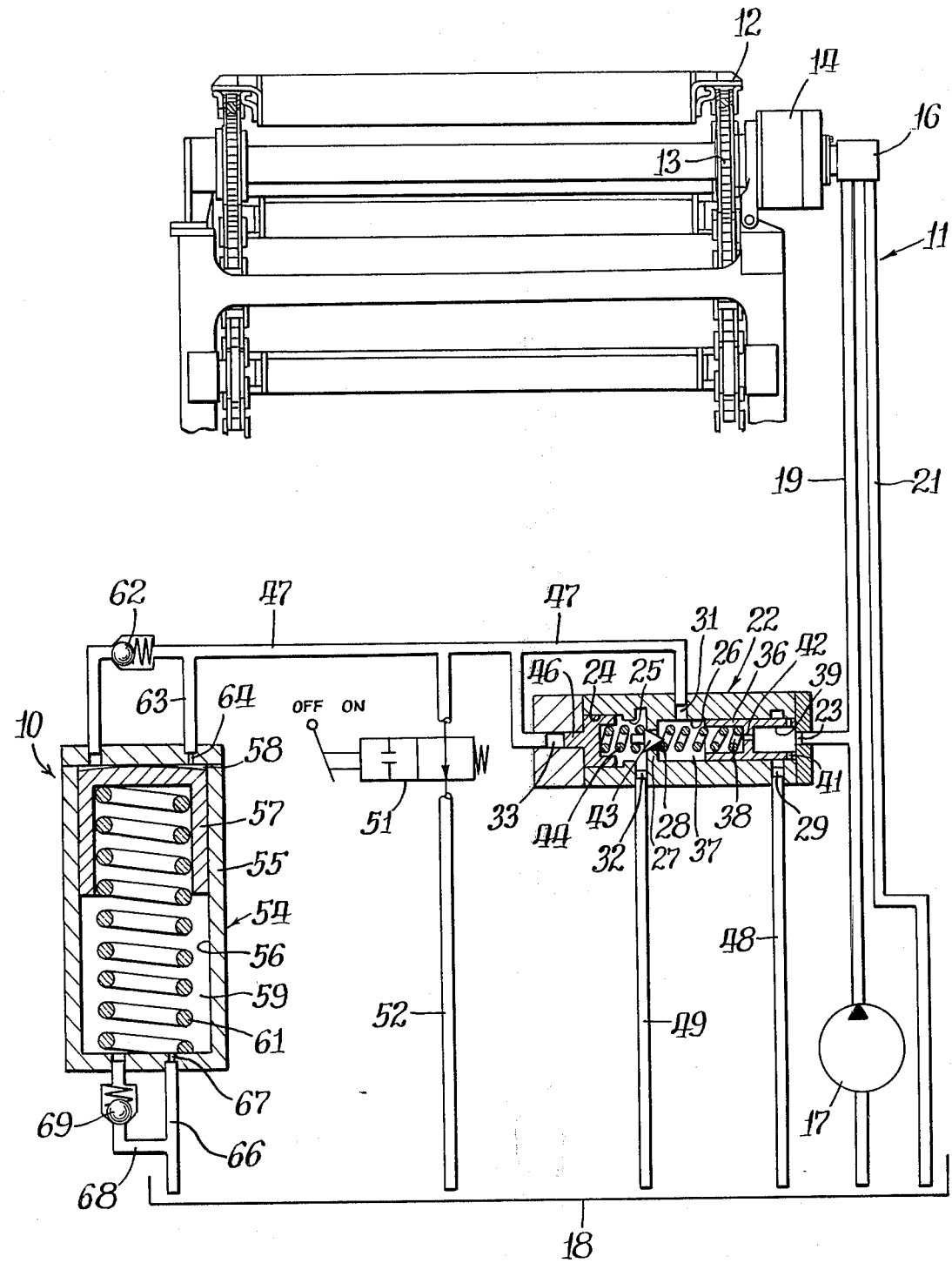

RELIEF VALVE DAMPENING DEVICE

BACKGROUND OF THE INVENTION

This invention relates to relief valves and pertains particularly to dampening means for a relief valve for a hydraulic circuit to dampen cyclic pressure spikes during initial starting of a motor controlled by the circuit.

Many hydraulic systems include a hydraulic motor in continuous communication with a hydraulic pump through a conduit with a control valve interconnected in the conduit to selectively dump the pump output to the tank. Operation of the motor is achieved by closing the valve so that the full pump flow is directed to the hydraulic motor. In such systems, sudden closing of the control valve for starting the motor generates undesirable cyclic pressure spikes or pulsations in the hydraulic system. Although such pressure spikes are normally less than the pressure required to open the relief valve, they frequently cause the pump to cavitate and over speed, both of which are detrimental to the life and dependability of the pump.

Some of the prior art approaches to damping problems in hydraulic systems are exemplified in the following U.S. Pat. Nos.: 3,067,772; 3,077,898; 3,106,993; 3,431,939; and 3,618,690.

These, however, have not satisfactorily solved the problem of surge in hydraulic systems of the type in question.

SUMMARY AND OBJECTS OF THE INVENTION

In accordance with the invention a dump type relief valve of the type having a balance chamber to control opening of the valve is provided with accumulator means restrictively communicating with the balance chamber.

It is a primary object of the present invention to provide means to overcome the aforementioned problems of the prior art.

Another object of the present invention is to provide dampening means for a hydraulic dumping valve.

BRIEF DESCRIPTION OF THE DRAWING

The single FIGURE is a schematic layout of a hydraulic circuit embodying a valve in accordance with the invention.

DETAILED DESCRIPTION OF A PREFERRED EMBODIMENT

Referring now to the drawing, there is illustrated a relief valve dampening assembly generally indicated at 10 in combination with a hydraulic circuit 11 for a hydraulically powered mechanism such as a scraper elevator mechanism partially shown at 12. The elevator mechanism includes a chain elevator 13 driven by a gear reduction drive unit 14 which is in turn powered by a hydraulic motor 16 in the usual manner.

The hydraulic circuit 11 includes a pump 17 which draws fluid from a tank or sump 18 and communicates pressurized fluid to the hydraulic motor 16 through a conduit 19. An exhaust conduit 21 returns the fluid from the motor to the tank. A relief valve 22 includes a high pressure inlet port 23 connected to the conduit 19. The valve comprises a housing defining a plurality of concentric bores 24, 25, and 26 formed therein with bores 25 and 26 being separated by an annular wall 27 having a central aperture 28 extending therethrough for communicating fluid between the bores. The valve assembly includes a pair of axially spaced outlet ports 29 and 31 in communication with the bore 26, an outlet port 32 and a control port 33 in communication with bore 25.

A dump spool 36 is reciprocably disposed in the bore 26 defining a balance chamber 37 adjacent to the annular wall at the back of the spool, and in communication with the outlet port 31. A spring 38 is disposed within the balance chamber for resiliently urging the dump spool toward the high pressure inlet port 23 for normally blocking communication between the inlet port 23 and the outlet port 29. The spool includes a blind axial bore 39 formed therein and a plurality of radial holes 41 extending from the inside of the bore to the outside of the spool. An orifice 42 provides communication of the bore 39 with the balance chamber 37.

A poppet valve 43 is disposed within the bore 25 and normally resiliently urged into sealing engagement with the aperture 28 in the annular wall 27 by a spring 44. The spring is disposed between the poppet valve and a piston 46 slidably disposed within the bore 24 and the control port 33. A conduit 47 interconnects the outlet port 31 with the control port 33. The outlet ports 29 and 32 are connected to the tank through conduits 48 and 49, respectively.

A two-position control valve 51 is operatively connected within a branch conduit 52 which interconnects the conduit 47 with the tank 18.

The relief valve dampening device 10 of the present invention includes an accumulator 54 which is connected to the conduit 47 and includes a cylindrical housing 55 having an axial bore 56 formed herein. A piston 57 is reciprocably disposed within the bore forming a variable volume pressure chamber 58 and an exhaust chamber 59 which are disposed on opposite sides of the piston. A spring 61 is disposed within the exhaust chamber for resiliently urging the piston toward the pressure chamber. The pressure chamber is connected to the conduit 47 through a check valve 62. A branch conduit 63 is interconnected to the conduit 47 between the check valve and the conduit 52 and communicates with the pressure chamber through an orifice 64. The pressure chamber 58 of the accumulator is thus in communication via the conduit 47 with balance chamber 37 and with control port 33. A conduit 66 communicates the exhaust chamber 59 with the tank 18 through an orifice 67 while a branch conduit 68 connects the exhaust chamber with the tank through a check valve 69.

Operation of the hydraulic motor 16 is controlled by manual manipulation of the control valve 51. Shifting the control valve to the off position shown vents the balance chamber 37 of the relief valve 22 to the tank 18 through the conduits 47 and 52. With the balance chamber vented, the orifice 42 in the dump spool 36 provides a pressure drop between the inlet port 23 and the balance chamber such that the dump spool 36 is shifted leftwardly against the bias of the spring 38 by a relatively low pump pressure to dump the output of the pump through the radial holes 41 and the outlet port 29 to the tank.

Shifting the control valve 51 to the on position blocks the fluid flow through the conduit 52, causing an immediate pressure rise in the fluid in the conduit 47 and the balance chamber 37, with the rate of pressure rise being determined by the dampening device 10 in the following manner. The fluid in the conduit 47 is transmitted through the branch conduit 63 and the orifice 64 which meters the fluid flow into the pressure chamber 58 of the accumulator 54. The fluid entering the pressure chamber forces the piston 57 downward against the bias of the spring 61 while the orifice 67 meters the fluid flow from the exhaust chamber 59 to the tank. Thus the orifices 67 and 64 cooperate with each other to precisely control the rate of downward movement of the piston, thereby controlling the rate at which the pressure increases in the conduit 47 and balance chamber 37. This dampens the pressure spikes caused by the abrupt blockage of fluid flow through the control valve. As the pressure increases in the balance chamber 37 and the pressure chamber 58, the dump spool 36 is forced to the right at a rate proportional to the rate of pressure buildup in the balance chamber. This gradually blocks the fluid flow from the inlet port 23 to the outlet port 29 causing a gradual increase in the pressure and volume of fluid directed to the hydraulic motor 16 through the conduit 19. The piston 57 of the accumulator 54 will bottom in the housing 55 when the fluid pressure in the conduit 19 approaches the minimum pressure required to operate the hydraulic motor 16. The dump spool and relief valve 22 will then operate in the usual manner with substantially the total pump output being directed to the hydraulic motor for driving the elevator mechanism 12. The piston will remain bottomed at the operational fluid pressure of the hydraulic circuit such that the dampening device has no effect on the response of the relief valve.

When the control valve 51 is shifted to the off position to stop the hydraulic motor 16, the check valve 62 permits rapid expulsion of the fluid in the pressure chamber 58 as the piston 57 is urged upwardly by the spring 61. Similarly, the check valve 69 permits fluid to be drawn into the exhaust chamber 59 from the tank.

While the invention is illustrated and described with respect to a single embodiment, it is to be understood that the scope thereof is intended to be defined only by the scope of the appended claims.

What is claimed is:

1. In a pressure-responsive dump valve having a control chamber with pressure-responsive means to vent said chamber and manual control means to selectively vent said chamber to effect opening of said valve, the improvement comprising:
   accumulator means comprising means defining an enclosed cylinder;
   a piston reciprocally disposed in said cylinder for defining a first variable chamber and biased by spring means toward one end thereof;
   an inlet port opening into said first variable chamber and including restriction means; and,
   an outlet port opening into said first variable chamber and including one way check valve means, fluid conduit means connecting said inlet and outlet ports with said control chamber.

2. The valve means of claim 1 including means defining a second variable chamber behind said piston; and, inlet and outlet conduit means connecting said second chamber with sump means.

3. The valve means of claim 2 wherein said inlet conduit means includes a check valve; and, said outlet conduit means includes restriction means.

4. The valve means of claim 1 wherein:
   said valve comprises a spool reciprocably disposed in a bore and operative to control fluid flow between a high pressure port and a low pressure port;
   restriction means for communicating pressurized fluid from said high pressure port to said control chamber;
   said valve being responsive to a predetermined minimum pressure in said control chamber to move to said closed position to block communication between said high pressure port and said low pressure port;
   said accumulator means being responsive to control a rise in the pressure in said control chamber by accumulating fluid at increasing pressure up to full capacity corresponding to said predetermined minimum pressure.

5. A dump valve having damping means comprising in combination:
   a housing having a bore therein with a high-pressure port and a low-pressure port communicating therewith;
   a spool reciprocally mounted in said bore and normally biased to a closed position for blocking communication between said high-pressure and said low-pressure ports;
   a balance chamber for controlling opening and closing of said valve spool;
   means for venting said balance chamber to open said valve;
   accumulator means comprising means defining an enclosed cylinder;
   a piston reciprocally disposed in said cylinder and defining a first chamber therein and biased by spring means toward one end thereof;
   an inlet port opening into said first chamber and including restriction means; and,
   an outlet port opening into said first chamber and including one way check valve means, fluid conduit means connecting said inlet and outlet ports with said balance chamber.

6. The valve means of claim 5 wherein said piston also defines a second chamber disposed at another end of said cylinder; and,
   inlet and outlet conduit means connecting said second chamber with sump means.

7. The valve means of claim 6 wherein said inlet conduit means includes a check valve; and,
   said outlet conduit means includes restriction means.

8. The dump valve of claim 5 in combination with a hydraulic circuit having a pump for supplying pressurized fluid via conduit means in continuous open communication with a hydraulic motor,
   said circuit having a predetermined minimum operating pressure, and a predetermined maximum operating pressure;
   said dump valve being connected by means of said high-pressure port to said conduit means for controlling the pressure in said circuit;
   said means for venting said balance chamber including a pressure responsive check valve responsive to said predetermined maximum pressure to vent said balance chamber for opening said valve at said maximum pressure and a manual valve for selectively venting said chamber for selectively opening said valve at pressures lower than said maximum pressure; and,
   said accumulator means being operative during a rise in pressure in said control chamber to accumulate fluid at increasing pressure up to its full capacity corresponding to said minimum operating pressure and the point of closing of said valve.

* * * * *